C. C. DAVIS.
MACHINE FOR MAKING ANNULAR STRUCTURES.
APPLICATION FILED NOV. 18, 1910.
1,012,992.
Patented Dec. 26, 1911.
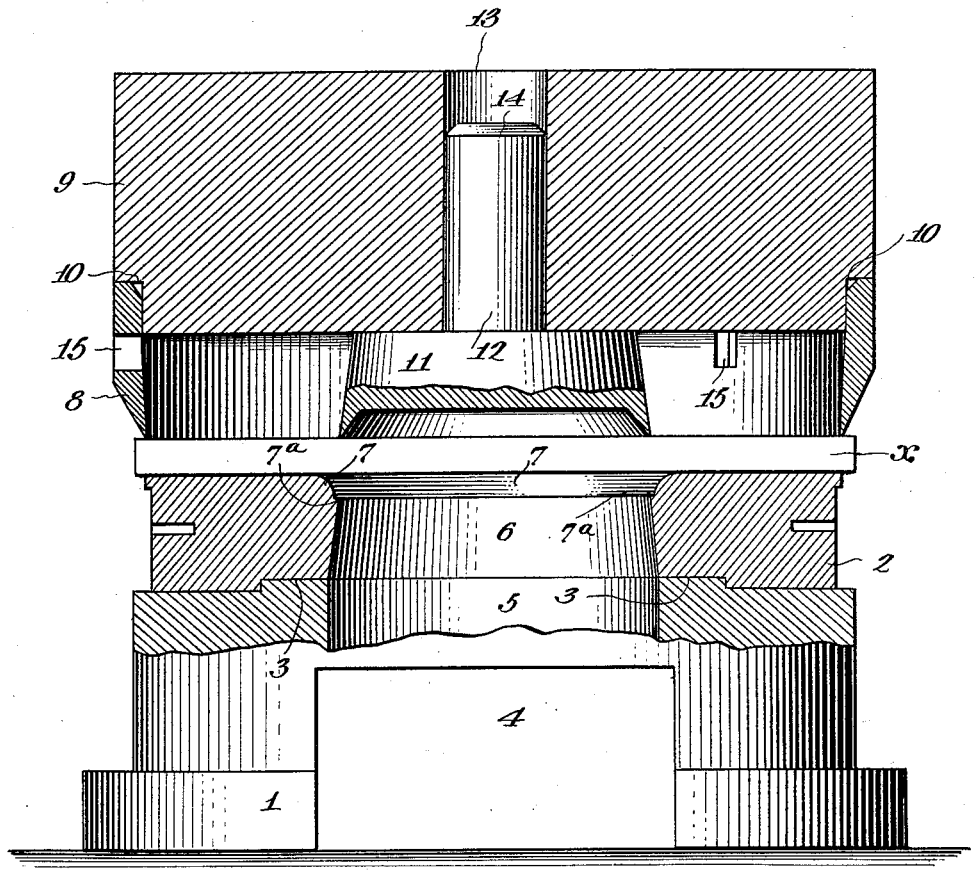
Witnesses:
Inventor:
Charles C. Davis.
by his Attorneys,

UNITED STATES PATENT OFFICE.

CHARLES C. DAVIS, OF PHILADELPHIA, PENNSYLVANIA.

MACHINE FOR MAKING ANNULAR STRUCTURES.

1,012,992.      Specification of Letters Patent.      Patented Dec. 26, 1911.

Application filed November 18, 1910. Serial No. 593,068.

*To all whom it may concern:*

Be it known that I, CHARLES C. DAVIS, a citizen of the United States, residing in Philadelphia, Pennsylvania, have invented certain Improvements in Machines for Making Annular Structures, of which the following is a specification.

One object of my invention is to provide a machine of novel construction for rapidly and inexpensively making annular structures and particularly those having on one side a hub, scarf, boss or annular projection, such for example as is employed for pipe flanges and the like.

Another object of my invention is to provide a novel machine for making annular structures and particularly those having a welding scarf or hub, which machine shall be simple and substantial in construction as well as have its parts arranged so that the stripping of the cutting members from the piece operated on shall be easily and quickly accomplished.

These objects and other advantageous ends I secure as hereinafter set forth, reference being had to the accompanying drawing, in which;—

The figure of the drawing is a vertical section illustrating the parts of a machine constructed according to my invention.

In the above drawing 1 represents the base for a lower die 2 mounted upon it and removably retained in a definite position by being provided with a recess which fits over a corresponding projection 3 on said base. This latter is provided with a transverse opening 4 extending through its lower portion and communicating through a central vertical opening 5 with a similar opening 6 in the die 2. The upper edges of this latter opening are curved as indicated at 7 to assist in the formation of the scarf or hub to be made on the annular structure formed from the plate, disk, or billet $x$. The outer edge of the die 2 is slightly overhung or tapered and co-acts with an annular cutting die or edge 8 designed to be actuated by a head 9. It is noted that said upper die 8 is preferably, though not necessarily, loosely engaged by said head and its upper inner edge is inwardly beveled or counterbored as indicated at 10 for a purpose hereinafter noted; its internal diameter being also slightly increased toward its top to permit stripping when said die is loose on the head. A second die 11 is provided with a central stem 12 fitting in a suitable centrally placed opening 13 of the head 9 and it is noted that the upper end of this stem is beveled or tapered as indicated at 14. The lower face of the die 11 is hollowed or relieved so that its operating portion consists merely of a relatively sharp annular cutting edge beveled both inwardly and outwardly. The cutting edge of the die 8 is likewise beveled outwardly.

Under operating conditions the head 9 is raised by appropriate power mechanism to a suitable distance above the base 1 and the lower die 2 is put in place upon the latter, being centered thereon by means of the projection 3. The plate or billet $x$ usually heated to a forging temperature, is then placed on the upper face of the die 2 and the two dies 8 and 11 are then put on the upper surface of said plate in approximately the positions which it is desired they shall occupy in cutting said plate. The head 9 is then forcibly moved down by any suitable power-actuated device such as a hydraulic or power press, a hammer, bulldozer, or other machine, and the tapered upper end 14 of the die stem 12 is entered into the hole 13 of said head so that the die 11 is properly centered over the opening 6 of the lower die. Similarly, after the head 9 has moved still farther down, the beveled edge 10, being engaged by the lower edge of said head, causes the die 8 to be properly centered over the outer edge of the lower die 2, after which both dies are forced into and through the plate. Owing to their construction, said dies both pass completely through the plate and with the pieces cut from the latter, fall below the same. The die 11 bends the plate edge downward into the flaring recess having the curved part 7 in the die 2, so as to form a welding scarf or hub, until the flat lip or abutment 7$^a$ is reached, when the latter coöperates with the die 11 as a shearing edge to cut the hole in the plate. Said die 11, with the disk cut out of the plate, may then be removed through the opening 4 in the base. After the head 9 has been raised, the finished flange or annular structure X may be removed and then the die 8 with the cut off edge of the plate may be taken away.

It is noted that the cutting edge of the die 11 is "relieved" or is sharp, so that the power required to force it through a plate or billet is less than would otherwise be the case and in addition the amount of drag or distortion of the upper edge of the plate or billet is likewise reduced. Again by providing the beveled portions 10 and 14 for the two dies, these are properly alined without the possibility of setting up injurious strains in the machine. Moreover since both dies are loose and are removed from the head 9 at each stroke, the speed of operation on heavy work is materially increased, and it is possible to change from one size of central die to another in a minimum time.

If desired, the outer upper edge of the lower die 2 could be rounded or curved if it were desired to form a lip on the plate operated upon. In some cases the die 8 might be permanently fastened to the head 9 without departing from my invention though in this case the interior surface of said die would be formed with an upwardly decreasing internal diameter in order to facilitate stripping. With this last named construction one or more slots 15 may be made in the upper die 8 to permit of the insertion of a bar for the removal of the annular structure.

While I have shown my machine as formed to cut annular structures having a circular outline and a circular opening, it is to be understood that by said term "annular" I include structures of rectangular or elliptical outline having openings of any desired form. It is to be noted that the terms "upper" and "lower" as applied to the dies, are used to distinguish them, since it is obvious that the machine might be reversed as to its position or operated on its side without departing from my invention.

As will be obvious to those skilled in the art, the curved part 7 or flaring recess in the lower die may be omitted if it be desired to use my machine to form plain annular structures, and it is of course immaterial whether the end of the stem 12 or the recess 13 is provided with the bevel or tapered for centering said stem. Similarly it makes no practical difference if the edge of the head 9 is beveled in place of the inner edge of the die 8.

I claim:—

1. The combination of a plate supporting structure; a power actuated movable head; and two independent dies placed to be actuated by said head to form an annular structure; said dies being loosely mounted in the head but formed to coöperate therewith and with the supporting structure to cut the plate.

2. The combination in a machine of the character described, of a supporting structure; a power-actuated head; and a die loosely mounted in but formed to be actuated by said head; there being a cavity in the head and a beveled surface on a portion of the die formed to enter said cavity, the die being unattached to the head but formed to coöperate therewith to act on a plate.

3. The combination in a machine of the character described, of a supporting structure; a power-actuated head; and a die unattached to the head but formed to be actuated thereby; said die having a beveled surface, and the head having a portion placed to coöperate with said surface to center the die.

4. The combination of a supporting structure; a power actuated head having a central cavity; a die having a tapered portion placed to be centered by and to enter said cavity; with a second die surrounding the first die and formed to be actuated by the head with the first die to form an annular structure.

5. The combination with a supporting structure; a die mounted thereon having a central cavity; a power actuated head; two dies formed to be actuated by said head and detached therefrom; both of said dies having tapered portions coöperating with parts of the head to cause alining of the two dies when the head is actuated.

6. The combination with a supporting structure, of a die mounted thereon having a central cavity and an outer overhung edge; a power-actuated head; two dies formed to be actuated by said head and capable of co-acting with the edge of the cavity and the overhung edge of the first die respectively; both of said upper dies being detached from the head and having means whereby they are alined relatively to the other die when actuated on by said head.

7. A device for making annular structures consisting of a base; a lower die thereon; a movable head; and an upper die on said head; one of said dies having a central opening with a flaring recess shaped to form a welding scarf or hub and extending from said central opening.

8. A device for making annular structures consisting of a base; a lower die thereon; a movable head; and an upper die on said head; one of said dies having a central opening with a flaring recess shaped to form a welding scarf or hub and extending from said central opening; said flaring recess terminating in an abutment placed to form a shearing edge with the upper die.

In testimony whereof, I have signed my name to this specification, in the presence of two subscribing witnesses.

CHARLES C. DAVIS.

Witnesses:
WILLIAM E. BRADLEY,
WM. A. BARR.